Figure 1:
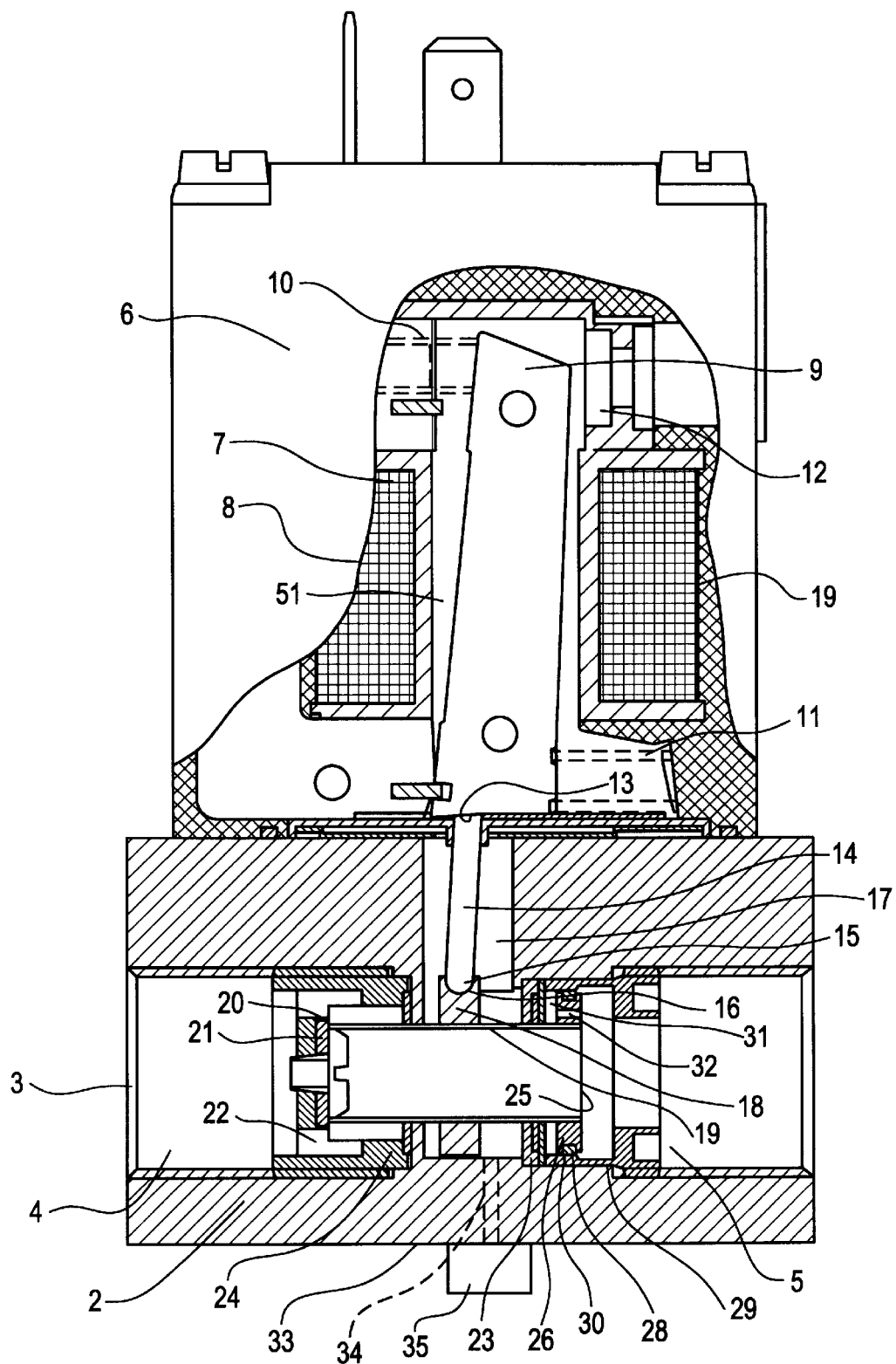

United States Patent
Hettinger

[11] Patent Number: 6,116,571
[45] Date of Patent: Sep. 12, 2000

[54] STRAIGHT VALVE

[75] Inventor: Gerhard Hettinger, Ingelfingen, Germany

[73] Assignee: Burkert Werke GmbH & Co., Ingelfingen, Germany

[21] Appl. No.: 09/147,389

[22] PCT Filed: Apr. 9, 1998

[86] PCT No.: PCT/EP98/02067

§ 371 Date: Dec. 14, 1998

§ 102(e) Date: Dec. 14, 1998

[87] PCT Pub. No.: WO98/46916

PCT Pub. Date: Oct. 22, 1998

[30] Foreign Application Priority Data

Apr. 14, 1997 [DE] Germany ................ 297 06 688 U

[51] Int. Cl.[7] .............................................. F16K 31/02
[52] U.S. Cl. ................... 251/129.2; 251/129.18
[58] Field of Search .................. 251/129.2, 129.17, 251/129.18

[56] References Cited

U.S. PATENT DOCUMENTS

| | | | |
|---|---|---|---|
| 2,675,508 | 8/1954 | Ray | 251/129.2 |
| 3,532,121 | 10/1970 | Sturman | 251/129.17 |
| 3,570,807 | 3/1971 | Sturman | 251/129.17 |
| 3,784,156 | 1/1974 | Paetzel et al. | |
| 4,285,497 | 8/1981 | Guttel | 251/129.2 |

FOREIGN PATENT DOCUMENTS

| | | | |
|---|---|---|---|
| 2 273 215 | 12/1975 | France . | |
| 951 691 | 5/1956 | Germany . | |
| 1068966 | 8/1956 | Germany | 251/118 |
| 60-18680 | 1/1985 | Japan | 251/129.2 |

*Primary Examiner*—Kevin Shaver
*Assistant Examiner*—D A Bonderer
*Attorney, Agent, or Firm*—Nixon Peabody LLP; Stuart J. Friedman, Esq.

[57] ABSTRACT

A direct-acting pressure-balanced linear valve (1) is provided with a hollow, displaceable sealing tube (19) which has a valve seat (20) and a valve body (49) having a valve seat seal (21). A drive unit (7) is arranged outside the media flow on one side and next to the sealing tube (19). A toothed segment (15) at an extension lever (14) of the drive unit (7) engages with a toothed segment (18) at the sealing tube (19). The drive unit (7) may be detached from the fluidic housing (2) without interruption of the media flow.

14 Claims, 2 Drawing Sheets

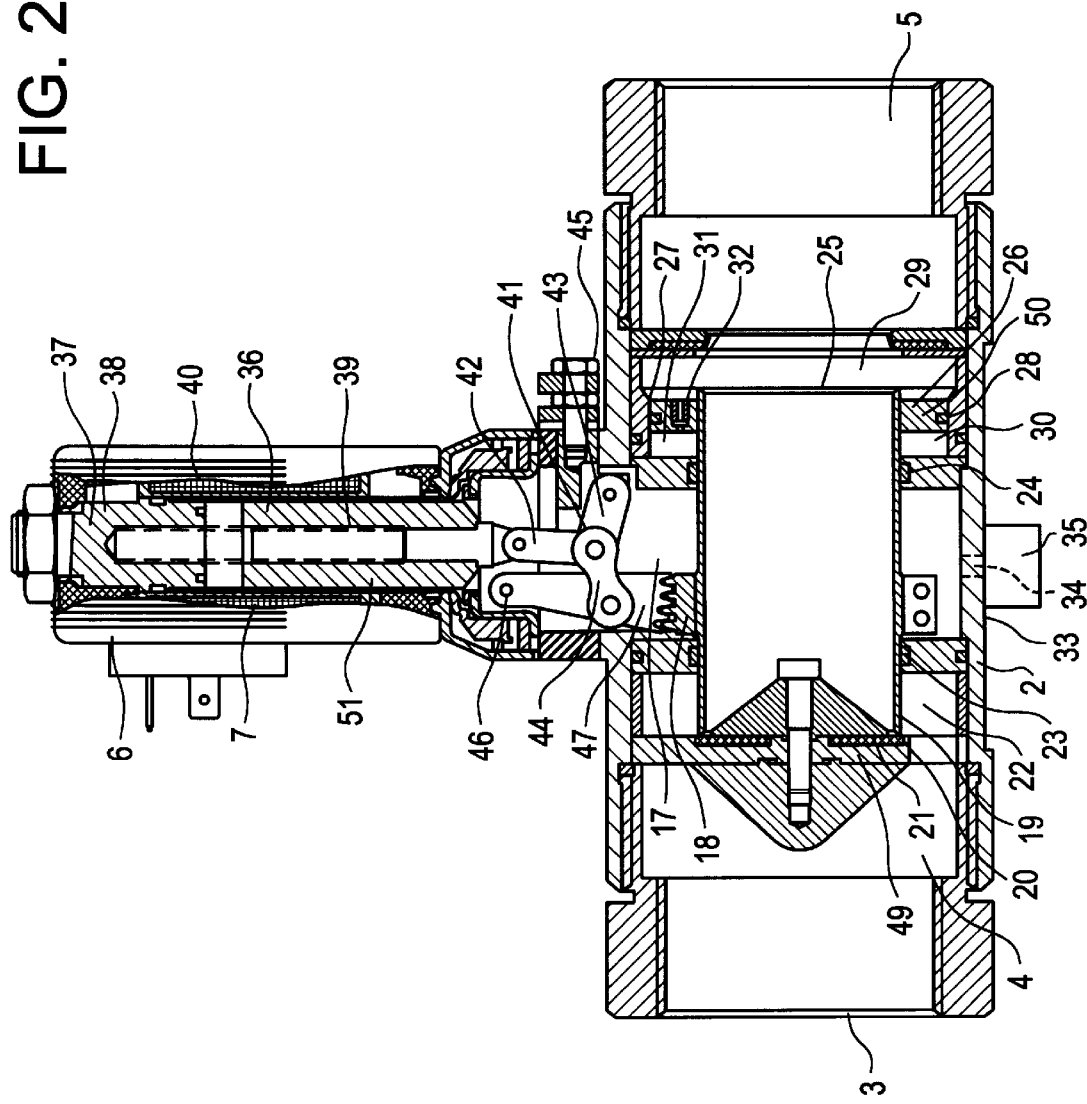

STRAIGHT VALVE

The invention relates to a direct-acting, pressure-balanced linear valve with a hollow, displaceable sealing tube.

In known linear valves of this type, a direct-acting magnetic drive or a piston drive actuated by a separate medium is arranged rotational-symmetrically around the sealing tube displaceable in the medium. Because of the rotational-symmetrical arrangement, an individual electric or pneumatic drive unit is required for each rated width. For the purpose of maintenance or repair of the drive unit, the linear valve must be completely removed from the media circuit in order to be able to replace the electric and the piston drive, respectively. Maintenance or repair of the drive unit of a linear valve therefore entails long downtimes of the entire installation.

The invention provides a linear valve in which the magnetic, pneumatic or electromotive drive component is arranged outside the media flow and provides a transmission, in particular by means of levers or toggle joints, which makes it possible to manage with lower electric or pneumatically produced drive forces. One drive component can therefore be used for several rated widths. Furthermore, the drive unit can be exchanged or replaced in a short time without having to interfere with the fluidic part of the linear valve. For example, manually operated, electromagnetic, pneumatic or electromotive drive modules may be attached. In accordance with the invention it becomes furthermore possible to change the valve function from no-current/no-pressure closed to no-current/no-pressure open electro-pneumatically in the pipe network.

It has proved particularly useful that the fluidic housing of the linear valve is provided at its underside with a drainage bore passing through to the outside, which, for example, enables any leakage of the seal to be seen directly. Furthermore, different sensor elements can be connected to this drainage bore, for purposes including position acknowledgement of the sealing tube, as well as leakage or flow indications.

In a preferred embodiment for linear valves with small rated widths from 4 to 10 mm, the drive unit is provided with a hinged armature which is preferably flanged to one side of the fluid housing and radially next to it and which by means of an extension lever provided with a toothed segment engages with the sealing tube with an interlocking fit. By reason of the proposed arrangement, the drive unit can be removed in a simple manner without interference with the fluid section.

The arrangement of the linear drive furthermore takes into account that between the fluid space of the linear valve and the armature space of the magnet there is an intermediate space, separated by seals and open to the outside, which prevents the entry of the medium into the armature space in case of leakage of one of the two groove and lip seals. This provision is especially advantageous with linear valves which are used for directing fluids, in particular linear valves employed for aggressive media, whereby the drive is preferably arranged above the fluid housing, for additional protection of the armature space.

With the linear valve according to the invention it becomes possible to keep the sliding force for the sealing tube low. To this purpose, the counteracting forces produced by the differential surfaces are to be minimized. According to the invention, this is achieved in that the sealing tube is embodied as a very thin-walled metal or plastic tube to which the seat is turned on.

A further improvement in minimizing the sliding forces is achieved by the use of lip seals for the seal sections on the sealing tube which for this purpose will be provided with a predetermined profile and inserted in an optimized way.

The reduction of the frictional forces at the seals and at the differential surface of the sealing tube to a minimum has the great advantage, as compared with known conventional embodiments, that equally high fluidic throughputs can be managed with smaller driving powers, which means smaller electromagnetic motorized or piston driven drives.

A further development of the invention furthermore provides for a simple way of damping the movement of the sealing tube. This damping effect is achieved in that the linear valve, in a first movement phase, opens/closes very quickly up to a small remaining gap and then, in a second movement phase and by the action of an end position damping part, completes the closing action in slow motion.

By virtue of the proposed arrangement, the fluidic part of the linear valve can be used for a wide range of media by making use of different materials for the housing, the tube, the seal and the connecting parts. In metallic construction, with the housing and the connecting parts made of brass, and a sealing tube of steel, all known control functions involving neutral media, such as water or steam can be realized with the aid of linear valves in 2/2- and 3/2-configurations. The same construction with components of stainless steel are particularly suited for analytical and medical applications, as well as in the food industry and for pharmaceutical use. With the housing, connecting parts and sealing tube made of plastics, such as PVC, PVDF, PEEK, the embodiment can be used with aggressive media in waste water treatment applications, in the chemical industry, and so on. In this case all parts coming into contact with the media are acid-resistant, all metal parts being protected by a vented intermediate space and double seals.

A further embodiment, suitable in particular for large rated widths, differs essentially from the previously described embodiment in that in place of a hinged armature, a lift-armature magnet, or a motor or piston drive is used. In this case, too, the drive unit can be advantageously detached from the fluidic section without having to interfere with the fluidic circuit. The force action of the magnet, the motor or the piston drive is preferably transmitted by a toothed segment to a rack at the sealing tube.

In order to make optimum use of the path-dependent force of an electromagnet, a toggle joint is arranged as an intermediate element between the armature of the magnet and the sealing tube, which translates the small forces generated by the dropped armature into a maximum closing and locking force. The lift/force characteristic of the magnet during the closing phase is transmitted by the contrasting length/force-characteristic of the toggle joint in such a way that small actuators are capable of controlling higher powers and, therefore, larger locking forces. This is particularly advantageous with large rated widths where the greater dimensions in the fluidic section lead to larger friction losses than with small rated widths.

The invention is explained in further detail in the following description with the aid of two preferred embodiments illustrated in the attached drawings in which:

FIG. 1 shows a schematic section through a linear valve with a hinged armature and a rack which engages in a toothed segment of the sealing tube for the purpose of controlling the movement of this sealing tube, and FIG. 2 represents a schematic section through a linear valve with a rack and a toothed segment for the control of the movement of the sealing tube, with a toggle joint for the transmission and amplification of the driving force.

The linear valve 1 shown in FIG. 1 consists of a fluidic housing 2 which is fitted in a pipe 3 between two pipe sections 4, 5, and a drive housing 6 which is attached one-sided with a drive unit 7 towards the top of the fluidic housing 2. In the drive housing 6 there is a coil 8 surrounding a hinged armature 9, which, as long as no counter force is exerted, is held in its position by the force of two springs 10, 11 until the current circuit of the coil 8 is closed or the hinged armature 9 is moved by means of a manual operating device and against the force of the springs 10, 11 out of the position shown.

At the underside 13 of the hinged armature 9 there is an extension lever 14 with a toothed segment 15 at its lower end 16, which extends into an open intermediate space 17 of the fluidic housing 2 and which engages with a toothed segment 18 at the sealing tube 19. In the position shown, the valve seat 20 turned on the sealing tube 19 is pressed onto the valve seat seal 21 at the fluidic housing 2 opposite the valve seat 20, and seals the media flow through the channel 22 between the pipe sections 4, 5.

By actuating the hinged armature 9 against the force of the springs 10, 11 the sealing tube 19 is pushed back by the toothed segment 15 provided at the hinged armature 9 with the extension lever 14, whereby the valve seat 20 of the linear valve 1 opens. The medium from the pipe section 4 flows via the channel 22 through the sealing tube 19 into the adjoining pipe section 5. The lip seals 23, 24 which annularly surround the sealing tube 19, seal the fluidic housing 2 with respect to the intermediate space 17 and to the armature space 51.

Opposing the valve seat 20 and at the end 25 of the sealing tube 19, there is a damping part 26 with a rectangular cross-section 50 and a seal 28. When the linear valve 1 is closed, the damping part 26 seals against the fluidic housing 2 by means of the seal 28 fitted into the outer face of the former. When the linear valve 1 is open, the medium flows around the damping part 26 because of the larger cross section 29 at the end of the fluidic housing 2.

Closing of the linear valve 1 proceeds pressure-balanced and very fast, on the one hand because of the thin-walled construction of the sealing tube 19, and on the other because a pressure equalization takes place at the damping part 26 of the sealing tube 19 as long as the damping part 26 is within the larger cross section area 29 of the fluidic housing 2. The displaced medium flows by the damping part 26 into the pipe section 5. When the damping part 26 enters the narrower cross section area 30 of the fluidic housing 2, the seal 28 seals the gap 31 hermetically all around. Only through a small choke bore 32 in the rectangular cross-section 50 is the medium allowed to flow from the closed gap 31, which causes the damped closure of the searing tube 19.

Preferably in the lower part 33 of the fluidic housing 2, a drainage bore 34 leads from the fluidic housing 2 to the outside of the valve. Sensor elements 35 (not shown in the illustration) for status acknowledgement are connected to this bore 34.

In the linear valve 1 in FIG. 2, a lift armature magnet 36 serves as the drive unit 7. The lift armature 36 is embodied in two parts 38, 39 which are connected by a spring 40. At the lower part 39 of the lift armature 37 there is provided a toggle joint 41 for the purpose of force transmission between the drive 7 and the sealing tube 19, which toggle joint is clamped fixed with one member 42 at the lower end 39 of the lift armature 36, and adjustably with a second member 43 at the drive housing 6 by means of a screw 45. A further member 44 of the toggle joint 41 is connected to a rack 47 by means of a leverage 46 in such a way that by virtue of the force/path ratio a comparatively large force is transmitted to the toothed segment 18 at the sealing tube 19.

The function of the linear valve 1 illustrated in FIG. 2 corresponds otherwise to that of the one described in FIG. 1 and the description given there applies, for reference.

What is claimed is:

1. A direct-acting pressure-balanced linear valve (1) for media flow therethrough, comprising a fluidic housing (2) having therewithin a hollow, displaceable sealingtube (19) provided with a valve seat (20) and a valve body having a valve seat seal (21), as well as a drive unit (7) engaging with the sealing tube (19), wherein the drive unit (7) is arranged as a separate unit outside the media flow within said valve said drive unit (7) being positioned next to the sealing tube (19) and coupled thereto by means of detachably intermeshing transmission means (15, 18), so that the drive unit (7) may be detached from the fluidic housing (2) without interruption of the media flow.

2. The linear valve according to claim 1, wherein the transmission means have a toothed segment (15) which is formed at an extension lever (14) of the drive unit (7) and engages with a toothed segment (18) at the sealing tube (19) in an open intermediate space (17) of the fluidic housing (2).

3. The linear valve according to claim 2, wherein the extension levee (14) engages with a hinged armature (9) of the drive unit (7).

4. The linear valve according to claim 2 or 3, toggle joint (41) transmits the force of the drive unit (7) by means of a leverage (46) to the toothed segment (18) at the sealing tube (19).

5. The linear valve according to claim 4, the closing force transmitted to the sealing tube (19) is adjustable by means of a screw (45) to which is fitted a member (44) of the toggle joint (41).

6. The linear valve according to any of the claims 1 to 3, wherein a single drive unit (7) can be used for a range of rated widths.

7. The linear valve according to any of the claims 1 to 3, wherein the valve seat seal (21) is arranged in the fluidic housing (2) and the sealing tube (19) carries, a turned-on valve seat (20) opposite the valve seal (21).

8. The linear valve according to any of the claims 1 to 3, wherein the sealing tube (19) is sufficiently thin-walled to permit rapid closing of said valve and made of metal.

9. The linear valve according to any of the claims 1 to 3, wherein the sealing tube (19) is sufficiently thin-walled to permit rapid closing of said valve and made of plastic.

10. The linear valve according to any of the claims 1 to 3, wherein the sealing tube (19) is surrounded by two lip seals (23, 24) which separate an intermediate space (17), open towards the drive unit (7), from the closed fluidic housing (2).

11. The linear valve according to any of the claims 1 to 3, the sealing tube (19) has a damping part (26) at the end (25) opposed to the valve seat (29), which part (26) is arranged in an annular configuration around the sealing tube (19), is of rectangular cross section (50) and is provided with a choke bore (32) as well as with a ring seal (28).

12. The linear valve according to any of the claims 1 to 3, wherein a drainage bore (34) at the underside (33) of the fluiding housing (2) provides a passage to the outside of said valve.

13. The linear valve according to claim 12, wherein a sensor module (35) is connected through the drainage bore (34).

14. The linear valve according to any of the claims 1 to 3, wherein it can be switched without interference with the fluid circulation from a function mode "normally closed" to a function mode "normally open" and vice versa.

* * * * *